United States Patent [19]

Yokota et al.

[11] Patent Number: 5,136,326
[45] Date of Patent: Aug. 4, 1992

[54] PHOTOMETRY DEVICE FOR CAMERA

[75] Inventors: Hidetaka Yokota; Kosei Kosako; Norimichi Takahashi, all of Tokyo, Japan

[73] Assignee: Asahi Kogaku Kogyo Kabushiki Kaisha, Tokyo, Japan

[21] Appl. No.: 634,602

[22] Filed: Dec. 27, 1990

[30] Foreign Application Priority Data

Jan. 19, 1990 [JP] Japan .................................. 2-3831

[51] Int. Cl.$^5$ .......................................... G03B 7/099
[52] U.S. Cl. .................................. 354/476; 354/481; 354/485
[58] Field of Search ............... 354/476, 478, 479, 480, 354/481, 485

[56] References Cited

U.S. PATENT DOCUMENTS

| 3,601,027 | 8/1971 | Ono et al. | 354/479 |
| 3,726,197 | 4/1973 | Hasegawa et al. | 354/480 |
| 4,341,448 | 7/1982 | Toyoda et al. | 354/476 |
| 4,555,169 | 11/1985 | Suda et al. | 354/480 |
| 4,615,602 | 10/1986 | Eguchi | 354/478 |
| 4,774,539 | 9/1988 | Suda et al. | 354/480 |
| 5,033,844 | 7/1991 | Itabashi | 354/478 |

FOREIGN PATENT DOCUMENTS

| 0358929 | 3/1990 | European Pat. Off. . |
| 956472 | 4/1964 | United Kingdom . |
| 1155544 | 6/1969 | United Kingdom . |
| 1306975 | 2/1973 | United Kingdom . |
| 1417345 | 12/1975 | United Kingdom . |

Primary Examiner—Russell E. Adams
Attorney, Agent, or Firm—Sandler, Greenblum & Bernstein

[57] ABSTRACT

A photometry device having a block body, constructed as a single body, on which all of the elements of a photometry system are mounted. The photometry system includes a condenser lens, a stop plate having a stop and a photosensor. An output characteristic of the photo sensor is determined by a pre-set resistance provided in a circuit board, and is adjusted during the process of assembling the block body. The photo sensor does not require a re-adjustment after the block body is assembled into a camera.

12 Claims, 1 Drawing Sheet

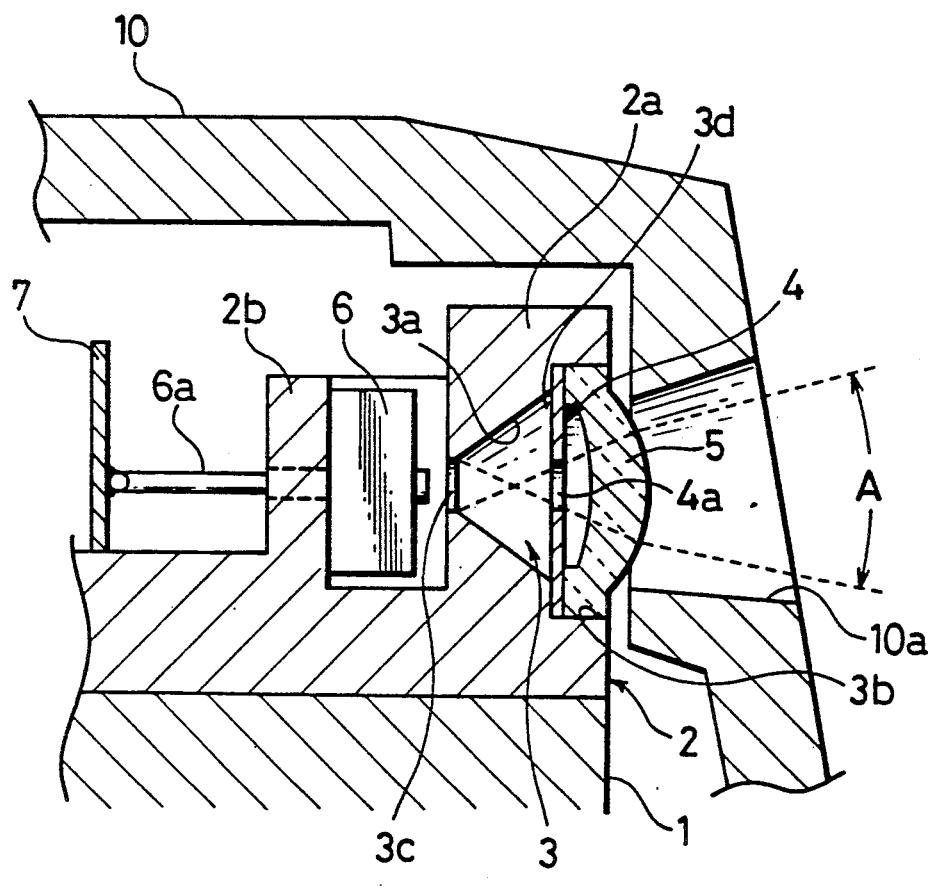

PHOTOMETRY DEVICE FOR CAMERA

BACKGROUND OF THE INVENTION

1. Field of the Invention

The present invention relates to a photometry device wherein an output characteristic thereof does not need re-adjustment after the device is assembled in a camera.

2. Description of the Related Art

For determining an exposure during photographing, a camera is provided with a photometry device by which the brightness of an object is sensed. The photometry device usually comprises a photo sensor and a condenser lens for condensing light reflected from the object onto the photo sensor. An electric signal obtained by the photo sensor is subjected to various processes, and is utilized in an automatic control mode of the camera for controlling, for example, a shutter speed, etc.

In a conventional photometry device, the condenser lens is mounted in a camera cover, and an opening formed in the camera cover is used as a stop through which a beam enters the photo sensor. Further, in a conventional construction, the elements composing the photometry device, i.e., the photo sensor, the condenser lens and a stop plate having a stop, are not all arranged as a single body. For example, some elements of the photometry device are separately mounted in the camera body and the camera cover. Accordingly, when the photometry device is assembled in a camera after an output characteristic of the photo sensor of the photometry device is adjusted by using an adjusting jig, sometimes the output characteristic obtained by the adjustment is lost due to play occuring during the assembling process, or to inaccuracies in the finished dimensions of the parts. Therefore, a re-adjustment may be needed after the photometry device is assembled in the camera, and as a result, the productivity of the assembly process of the camera is lowered.

SUMMARY OF THE INVENTION

Therefore, an object of the present invention is to provide a photometry device for a camera whereby an output characteristic of the photometry device does not need re-adjustment after the photometry device is assembled in the camera.

As a result of an intensive study of the above problem, the inventors found that if all of the elements composing a photometry system are arranged as a single body, the problems caused by play or dimensional inaccuracies do not arise, when the photometry system is assembled to the camera. Thus, a re-adjustment of the output characteristic is not required.

According to the present invention, there is provided a photometry device comprising a photometry system including a photo sensor and a block body in which all of the elements of the photometry system are provided.

According to the present invention, there is provided a photometry device, in which all of the elements of a photometry system, including a photo sensor, are mounted on a single block body.

Further, according to the present invention, there is provided a photometry device comprising a block body provided with a photo sensor, and a circuit board, a stop member, and a lens for condensing light onto the photo sensor. The circuit board has an electric circuit by which an output signal of the photo sensor is processed. The circuit board is arranged on the block body.

Furthermore, according to the present invention, there is provided a photometry device in which a photo sensor, a lens and a stop member are mounted on a block body.

BRIEF DESCRIPTION OF THE DRAWING

The present invention will be better understood from the description of the preferred embodiment of the invention set forth below, together with the accompanying drawing, which is a sectional diagram showing an embodiment of the present invention.

DESCRIPTION OF A PREFERRED EMBODIMENT

The present invention will now be described with reference to the embodiment shown in the drawing.

The FIGURE shows an embodiment of a photometry device of the present invention, wherein a block body 2 is fixed to a camera body 1 which is provided with a lens system, a shutter mechanism, and a winding mechanism, etc. The block body 2 comprises a first end wall 2a which forms an outer or front side of the block body 2, and a second end wall 2b which forms an inner or rear side of the block body 2. The first end wall 2a includes an aperture 3, composed of a cone-shaped portion 3a and an enlarged portion 3b that has a cylindrical inner surface. The cone-shaped portion 3a is composed of a small diameter portion 3c and a large diameter portion 3d. The enlarged portion 3b is arranged at the opening of the large diameter portion 3d and has a larger diameter than that of the large diameter portion 3d.

A stop plate 4, on which a stop 4a is formed, is arranged in the enlarged portion 3b of the aperture 3. A condenser lens 5 is also arranged in the enlarged portion 3b, positioned in front of the stop plate 4. A photo sensor 6, comprising a cadmium sulfide (CdS) cell, etc., is arranged behind the stop plate 4 and attached to a front surface of the second end wall 2b. Namely, the photo sensor 6 is arranged between the first end wall 2a and the second end wall 2b. An electrode 6a, of the photo sensor 6, is extended through a hole formed in the second end wall 2b and is electrically connected by soft solder to a circuit board 7, arranged at the rear of the photo sensor 6 and fixed to the block body 2. The circuit board 7 is provided with a pre-set resistance for adjusting an output characteristic of the photo sensor 6. This pre-set resistance is a variable resistance having a value which is adjusted during the assembling process and is not changed after the assembling, and thus has a constant value.

The photometry device in this embodiment, includes the condenser lens 5, the stop plate 4, the photo sensor 6, and the circuit board 7. The photometry device is covered with a camera cover 10, having an opening 10a which is wider than a maximum photometry range A. This photometry range A is determined by the condenser lens 5, the stop 4a of the stop plate 4, and the small diameter portion 3c of the cone-shaped aperture 3.

In the photometry device of this embodiment, light reflected by an object is condensed by the condenser lens 5, and passed through the stop 4a of the stop plate 4 and the small diameter portion 3a of the cone-shaped aperture 3. The amount of light is controlled by the stop plate 4, whereupon the light reaches the photo sensor 6. Since the opening 10a of the camera cover 10 is wider than the maximum photometry range A, the camera cover 10 does not interfere with light entering the photo sensor 6, which thereby generates an electric signal corresponding to a brightness of the object. The electric signal is then processed by an electric circuit provided on the circuit board 7, whereby an automatic control for an exposure, a shutter speed, etc., is carried out.

As described above, since construction of this embodiment is such that all of the elements of the photometry system are provided on a single block body 2, an output characteristic of the photo sensor 6 is adjusted after all of the elements of the photometry system are mounted on the block body 2. Accordingly, once the output characteristic of the photo sensor 6 has been adjusted during the assembling of the elements on the block body 2, an adjustment of the output characteristic is not required after the block body 2 is assembled in the camera. Therefore, according to the present invention, the productivity of the assembling process of the camera is improved.

When assembling the photometry device of the embodiment in a camera body, first, the condenser lens 5, the stop plate 4, the photo sensor 6 and the circuit board 7 are mounted on predetermined positions of the block body 2. Then, an output characteristic of the photo sensor 6 is adjusted by varying a resistance value of the pre-set resistance provided to the circuit board 7. After this adjustment, the photometry device is assembled in the camera body.

Although a photometry device having a construction shown in the FIGURE is described herein, as an embodiment of the present invention, the present invention is not restricted to this construction, and many modifications and changes can be made thereto. For example, the aperture 3 can have a shape other than a cone shape, as long as the construction thereof allows light reflected from an object and condensed by the condenser lens 5 to enter the photo sensor 6 without interference.

The present disclosure relates to subject matter contained in Japanese patent application No. 2-3831 (filed Jan. 19, 1990) which is expressly incorporated herein by reference in its entirety.

We claim:

1. A photometry device for a camera, said device comprising:
   a photometry system including a photo sensor and a lens for condensing light reflected from an object onto said photo sensor; and
   a block body on which all elements of said photometry system are mounted, said block body including a first end wall having an aperture, said aperture having a small diameter portion and an enlarged portion, said lens being positioned in said enlarged portion, and said photo sensor being positioned behind said first end wall.

2. A device according to claim 1, wherin said photometry system includes a stop member for controlling the amount of light which is directed to said photo sensor.

3. A device according to claim 2, further comprising a circuit board which has an electric circuit for processing a signal generated by said photo sensor.

4. A device according to claim 3, wherein said block body is provided with a second end wall having a hole, said stop member being arranged in said aperture of said first end wall, said lens being positioned in front of said stop member, said photo sensor being arranged between said first end wall and said second end wall, and said circuit board being arranged at a position behind said second end wall and electrically connected to said photo sensor through said hole of said second end wall.

5. A device according to claim 4, wherein said aperture has a cone-shaped portion between said small diameter portion and a large diameter portion, said enlarged portion arranged at an opening of said large diameter portion, said stop member being disposed in said enlarged portion.

6. A device according to claim 5, further comprising a cover having an opening which is wider than a maximum photometry range determined by said condenser lens, and a stop formed in said stop member, and said small diameter portion of said aperture.

7. A photometry device for a camera, said device comprising a photometry system including a photo sensor and a lens for condensing light reflected from an object onto said photo sensor, and a block body including a first end wall having an aperture, said aperture having a small diameter portion and an enlarged portion, said lens being positioned in said enlarged portion, and said photo sensor being positioned behind said first wall, wherein all elements of said photometry system are mounted on said block body which is constructed as a single body.

8. A device according to claim 7, comprising a stop member, said stop member being located in said enlarged portion.

9. A photometry device for a camera, said device comprising:
   a block body provided with a photo sensor and a circuit board having an electric circuit by which an output signal of said photo sensor is processed said block body including a first end wall having an aperture, said aperture having a small diameter portion and an enlarged portion;
   a stop member having a stop and arranged on said block body; and
   a lens for condensing light onto said photo sensor, said lens being arranged on said block body, wherein said lens is positioned in said enlarged portion, and said photo sensor is positioned behind said first end wall.

10. A device according to claim 9, wherein said stop member is located in said enlarged portion.

11. A photometry device for a camera having a photo sensor, a lens for condensing light reflected from an object onto said photo sensor, and a stop member for controlling the amount of light which is directed to said photo sensor, characterized in that said photo sensor, said lens and said stop member are mounted on a block body, said block body including a first end wall having an aperture, said aperture having a small diameter portion and an enlarged portion, said lens being positioned in said enlarged portion, and said photo sensor being positioned behind said first end wall.

12. A device according to claim 11, wherein said stop member is located in said enlarged portion.

* * * * *

UNITED STATES PATENT AND TRADEMARK OFFICE
CERTIFICATE OF CORRECTION

PATENT NO. : 5,136,326
DATED : August 4, 1992
INVENTOR(S) : H. YOKOTA et al.

It is certified that error appears in the above-indentified patent and that said Letters Patent is hereby corrected as shown below:

Column 4, line 17 (claim 6, line 4), after "member" delete ",".

Column 4, line 38 (claim 9, line 5), after "processed" insert ---,---.

Signed and Sealed this

Tenth Day of May, 1994

Attest:

BRUCE LEHMAN

Attesting Officer

Commissioner of Patents and Trademarks